No. 843,100. PATENTED FEB. 5, 1907.
F. H. RICHARDS.
CANDY WORKING MACHINE.
APPLICATION FILED MAY 27, 1905.
2 SHEETS—SHEET 1.
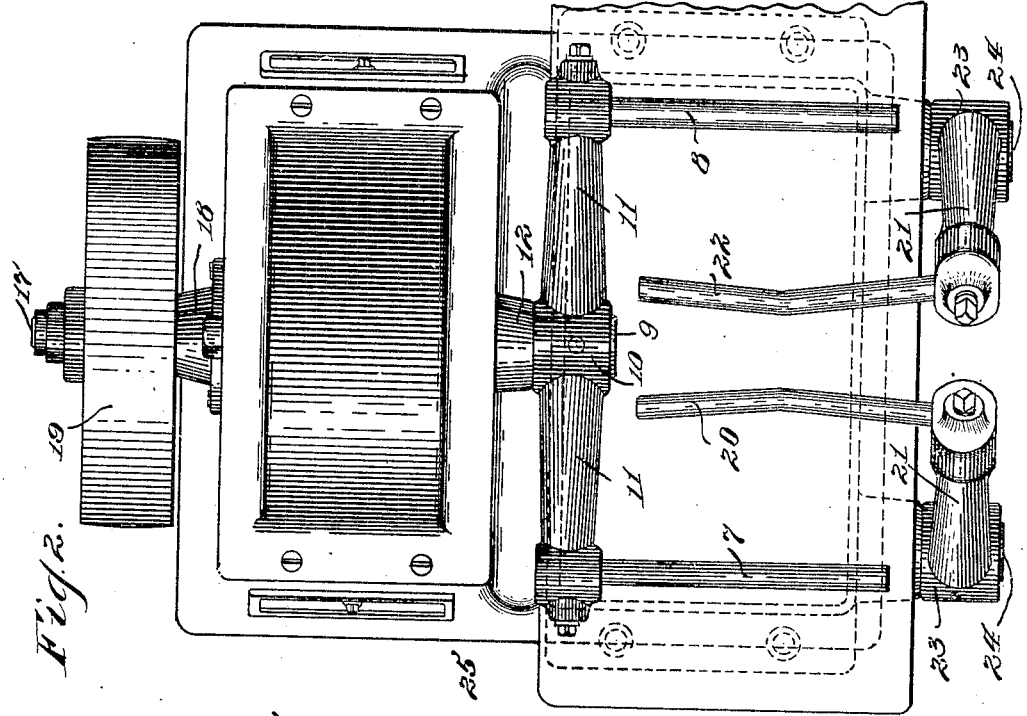
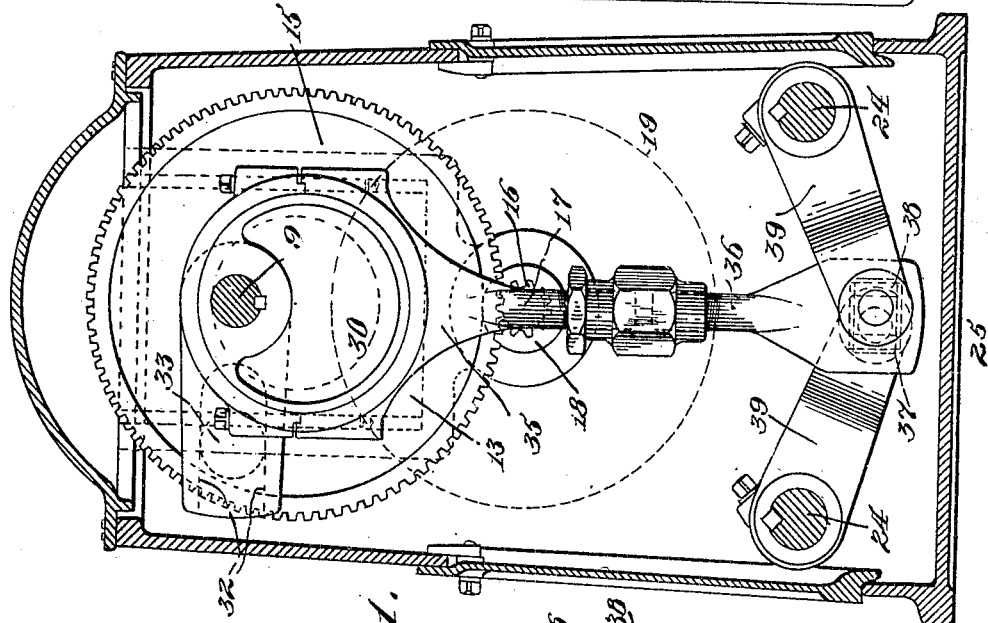
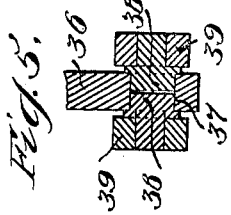
Witnesses:
Inventor:

No. 843,100. PATENTED FEB. 5, 1907.
F. H. RICHARDS.
CANDY WORKING MACHINE.
APPLICATION FILED MAY 27, 1905.
2 SHEETS—SHEET 2.
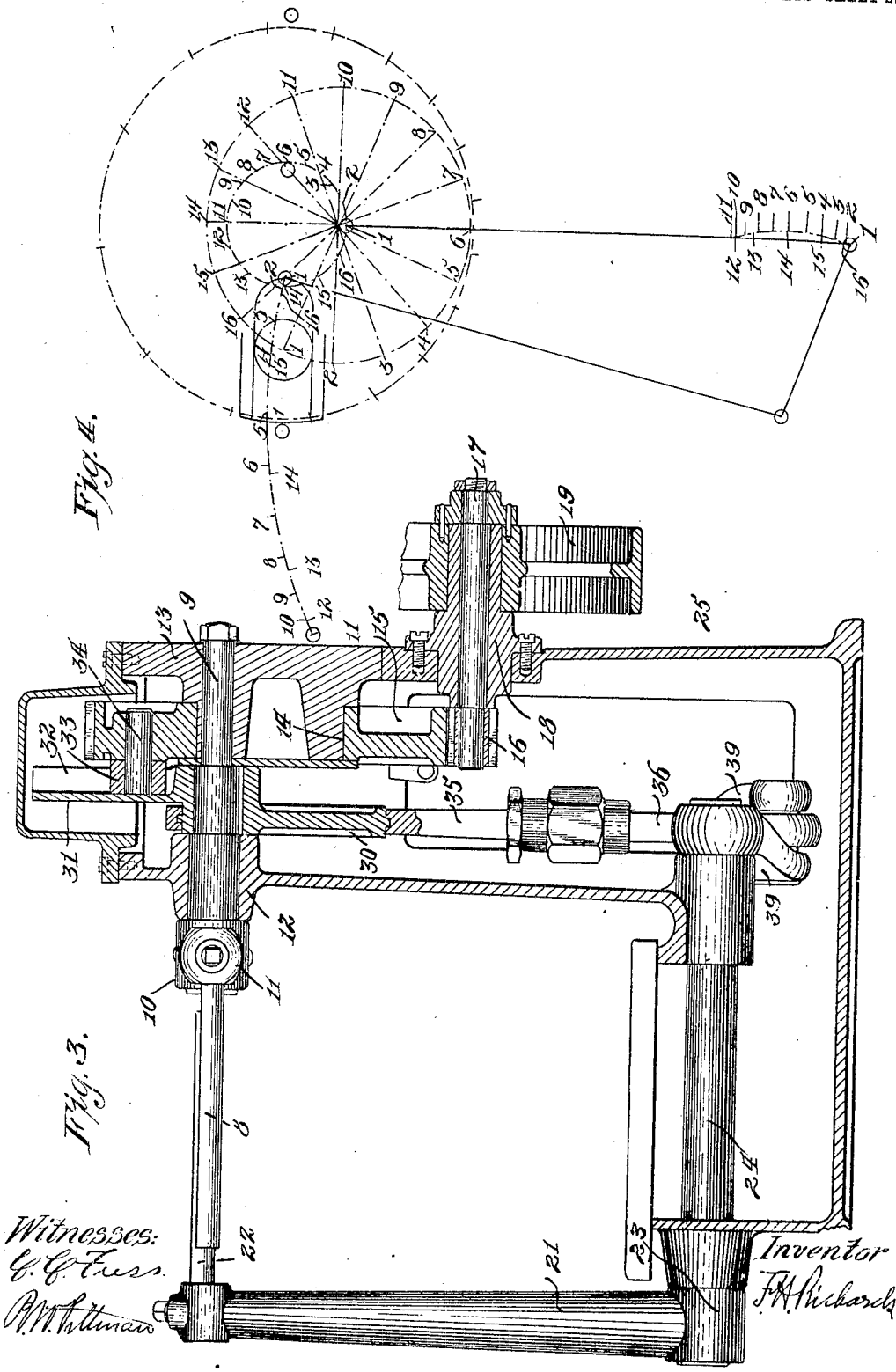
Witnesses:
Inventor

UNITED STATES PATENT OFFICE.

FRANCIS H. RICHARDS, OF HARTFORD, CONNECTICUT.

CANDY-WORKING MACHINE.

No. 843,100.　　　　　Specification of Letters Patent.　　　　　Patented Feb. 5, 1907.

Application filed May 27, 1905. Serial No. 262,539.

*To all whom it may concern:*

Be it known that I, FRANCIS H. RICHARDS, a citizen of the United States, residing at Hartford, in the county of Hartford and State of Connecticut, have invented certain new and useful Improvements in Candy-Working Machines, of which the following is a specification.

This invention relates to the candy making art, and has for an object to provide an improved power-driven variable-speed candy working or pulling machine.

The invention relates more particularly to that class of apparatus wherein the mass of candy is worked by a number of arms divided up into sets, each of which sets has a different movement from that of the other set and all of which work in coöperation upon the mass of candy, drawing it out, lapping or folding the drafts, and kneading the mass so drawn and folded. The mass of candy at some of the periods of its working is pulled out in a number of comparatively long drafts, and for the kneading treatment practically the entire mass is brought together.

The nature of certain kinds of candy is such that when the draft or pulled-out portion is long and the drawing action is rapid the draft will separate or will become so attenuated at about its center that there will be practically no working of the mass of candy in such draft. Consequently if the apparatus is driven at a constant speed such speed will have to be as slow as the fastest speed which the candy where drawn out will permit of. The operation of machines heretofore in use has been to run them at such slow speed; but by my improvement the machine may be run at a rapid speed except during that portion of its cycle when the draft is approaching that critical condition, particularly as to length, where slow movement must be resorted to to maintain the proper working of the candy in the draft and to prevent its separation or undue attenuation. On account of the locations in which this class of machines is very generally used, as in stores and other places where only electric power is available, they have usually to be driven by electric motors. It is also usually deemed desirable to employ a separate motor for each machine, the motor being geared directly to the operating devices thereof. It is evident the motor should be of a size and power equal to the stress due to the greatest resistance in any part of the complete operation. This highest stress normally occurs when the longest drawings are making simultaneously on the greatest number of strands. This period also is the one during which the nature of the stock, especially if this be soft and readily separated or broken in the strands, naturally calls for the slowest speed of revolution or reciprocation of the revoluble and reciprocatory member or members of the working devices. By means of my several improvements these several objects and results are obtained and properly timed, a simple and efficient organization of mechanism that only requires a motor of a size and power equal to the maximum stress on the working devices reduced in correspondence with the ratio of speed variation. The result is that a motor of a given power can operate a machine of a given capacity much more rapidly (as to frequency of operations per minute) or can operate the machine at a given frequency with a much smaller maximum stress on the driving member. In either case there results, evidently, a large economy. There is also a further advantage in that a given amount of working can be applied to the stock in much less time with the speed of draft on the strands limited to a given velocity. By this means the duration of the working process is materially shortened, with a correspondingly large reduction in cost of labor and in machinery and power.

A twofold object is had in view in this mechanism—namely, regulating a variable speed to accommodate the peculiarities of material being treated, the character and requirements of which material vary at different stages of the treatment to which it is subjected, and also to adjust the power applied to the mechanism for treating the material so that at the successive stages of the treatment the power applied will be varied and regulated and the load on the motor will remain substantially uniform.

This invention is peculiarly applicable to the form of machine illustrated in my United States Patent No. 764,538, granted to me July 5, 1904, wherein there are a pair of arms which are revolved in a circular orbit and there are a pair of arms which are reciprocated to and from each other and in and out of such orbit of the revolving arms, whereby the candy is drawn out and folded in a peculiar manner, it being given three long drafts, which are lapped and folded together, and two short drafts, which are lapped together, and then the lapped mass is kneaded prior to the repetition of the drawing out of the long drafts. While the long drafts are being pulled out a greater amount of power is required than at certain other periods in the cycle of operation, and at such periods of drawing the long draft such long drafts must be moved slowly to prevent the separation of the strands or the undue attenuation of the drafts above alluded to. Thus by reducing the speed of the drawing-arms at this period the load will not be augmented, but will remain substantially uniform, since at the periods requiring the greatest amount of power the timing of the driving mechanism will be such that the speed will be slowed down, consequently conserving the power. The timing of the revolving arms will be different from the timing of the reciprocatory arms, so that there may be a dwell of the reciprocatory arms during certain movements of the revolving arms, and vice versa.

The present improvement has particularly to do with an organism wherein certain movable parts, adapted for coöperation for working a mass of candy, are so actuated and controlled that at certain periods the movement of some of such members will be retarded with a concurrent increase in power and at other periods, when the necessity for the greatest power is not required, the movement of such parts will be accelerated, thus enabling the motor supplying the power for such actuation to be utilized at its highest efficiency at all times, and when the load of the work increases the load upon the motor will be compensated for by suitable variable-speed gearing.

In the drawings accompanying and forming a part of this specification, Figure 1 is a vertical cross-section through a machine embodying a form of my invention. Fig. 2 is a top plan view thereof. Fig. 3 is a longitudinal vertical section; and Fig. 4 is a chart or diagram showing the relative speeds of the different parts of the apparatus, and Fig. 5 is a detail of the eccentric-rod head.

The candy-working mechanism herein illustrated embodies a pair of arms 7 and 8, which are revoluble about a common axis, in the present instance the axis of rotation of the shaft 9, by which they are carried, such shaft having fastened upon it a hub 10, having arms 11 projecting in opposite radial directions and by which the arms 7 and 8, respectively, are carried so that upon the rotation of the shaft such arms will travel in a uniformly-circular orbit. A pair of arms 20 and 22 are mounted for reciprocation into and out of the orbital circuit of the revoluble arms and during each revolution thereof, the organization being such that each revoluble arm during one revolution passes inside of one reciprocatory arm and outside of the other reciprocatory arm. This makes one of the reciprocatory arms come inside the orbit of revolution of one of the arms and outside of the orbit of revolution of the other of said arms, which according to the method described in my concurrently-pending application, Serial No. 212,453, filed June 4, 1904, which matured into Letters Patent No. 791,920 on May 30, 1905, there will be given to a mass of candy carried by such arms a pulling or working action which will pull the candy into three comparatively long drafts, lap the drafts into a mass, leaving the ends of the drafts overhang the lapped mass, after which applying pressure to both sides of the mass to knead the same, during which the overhanging ends are slightly drawn and wrapped about the mass while the same is being kneaded and worked.

The reciprocatory arms are carried by arms 21, fastened, by means of suitable hubs 23, to rock-shafts 24, having suitable bearings in the machine-frame, (designated in a general way by 25.) The shaft 9 has a bearing 12, supported by said machine-frame at one side, and a bearing in a removable cap 13 at the other side, which cap has upon it an external bearing-face 14, upon which is mounted a ring 15, having gear-teeth on its perimeter. Said perimeter is eccentric to the axis of the shaft 9. The gear-ring 15 is in mesh with a pinion 16, fast upon the driving-shaft 17, which shaft has fast upon it a pulley 19, which may be driven by a belt from some suitable source of power. (Not shown.) An eccentric 30 is fast upon the shaft 9 and has an arm 31, having bearing-faces 32 at its opposite sides, forming a way for an actuator, which in the present instance is shown as a roll 33, carried by a wrist-pin 34, mounted in the web portion of the ring 15. The eccentric is embraced by an eccentric-strap 35, carrying an eccentric-rod 36, which has a slideway 37 in its lower end adapted to receive slides 38, carrying wrist-pins having bearings in rock-arms 39, fast upon the rock-shafts 24.

It will be seen that upon the rotation of the driving-shaft 17 the pinion carried thereby will cause the rotation of the ring 15, which by the engagement of the roll 33 with the faces 32 will rotate the shaft 9 at a variable speed, since by reference to Fig. 4 it will be seen that as the ring 15 is eccentric to such shaft as the radius-line between the axial line of the actuator 33 and of the shaft 9 increases the speed imparted to the shaft 9 will decrease and that as such radius decreases the speed of rotation of the shaft 9 will accelerate. The eccentric will cause the arms 20 and 22 to reciprocate, their outward movement being relatively slow at that position where the candy is drawn out into the long drafts, and particularly when the arms 20 and 22 and 7 and 8 are approaching the positions indicated in Fig. 4. This long pulling movement takes place while the actuator 33 is moving from about the position 1 to 11 upon the diagram.

The form of mechanism illustrated herein is such that the parts may be cheaply and conveniently made for assemblage, since it will be seen that the cap 13 is removable from the frame and may have its bearing-surfaces properly machined without necessitating the manipulation of the entire casting, and so with the bearing 18 for the driving-shaft.

Having described my invention, I claim—

1. In a candy-working machine, the combination with means for engaging a mass of candy, of means for actuating the same for alternately slowly pulling said mass into long drafts and quickly folding said drafts together.

2. In a candy-working machine, the combination with means for engaging a mass of candy, pulling said mass into long drafts and folding said drafts together, of means for driving the same rapidly during the folding operation and slowly during the pulling operation.

3. In a candy-working machine, the combination with means for engaging a mass of candy and embodying a pair of arms reciprocatory in opposite directions, of means for actuating said reciprocatory arms and moving these rapidly toward each other and slowly away from each other.

4. In a candy-working machine, the combination with a number of members for holding a mass of candy, of means for actuating said holding means alternately at rapid and at slow speeds, for working said mass of candy by a series of alternately slow and rapid sequential steps.

5. In a candy-working machine, the combination with means for working a mass of candy in two directions, the working in one direction requiring more power than in the other direction, of means for driving the same at a slow speed in the direction requiring the greatest power and at a more rapid speed in the direction requiring the lesser power for maintaining the constancy of the load.

6. In a candy-working machine, the combination with a system of working devices comprising revolving and reciprocating members for drawing the candy out into a number of main strands and lapping and kneading the strands together, of a driving member, and a variable-speed actuator connecting said driving member and the said working devices and organized for driving the working devices at a relatively slow speed during the drawing out of the main strands, at a relatively higher speed for making the laps and at a relative lower speed for kneading the strands together.

7. In a candy-working machine, the combination of a system of working devices comprising drawing and lapping arms, a driving member, and a variable-speed actuator connecting said driving member and the working devices and organized for driving the working devices at a relatively slow speed during the drawing and at a relatively higher speed for making the laps, whereby the operations are increased in frequency, with a reduction of maximum stress on the driving member.

8. In a candy-working machine, the combination with a series of arms, of means for revolving a portion thereof in an orbital path, means for reciprocating other of said arms respectively in opposite directions rapidly toward each other and toward the axis of revolution of said revoluble arms for bringing the same against the material carried thereby and then moving the said arms slowly to knead the said mass and then moving said arms slowly away from each other and from said axis to pull the said mass.

9. In a candy-working machine, the combination with a plurality of revoluble arms, of a pair of oppositely-disposed reciprocatory arms adapted to pass radially through the orbit of revolution of said arms and engage the mass carried by such arms and to press the same toward the axis of said arms during the revolution thereof and to move away from said axis in opposite directions to pull the candy into long drafts, and means for actuating said arms and for moving the reciprocatory arms away from said axis at a slower speed than toward the same.

10. In a candy-working machine, the combination with means for engaging a mass of candy, of means for actuating the same and constructed and arranged for alternately pulling out said mass and quickly folding the same together.

11. In a candy-working machine, the combination with means for engaging a mass of candy, pulling said mass out into drafts and folding said drafts together, of means constructed and arranged for driving the same rapidly during the folding operation and slowly during the pulling operation.

12. In a candy-working machine, the combination with means for engaging a mass of candy and embodying a pair of arms reciprocatory in opposite directions, of a shaft connected to said arms for so reciprocating the same, a pair of revoluble arms, a shaft connected to said arms for revolving the same, an eccentric and eccentric-strap for oscillating the shaft of the reciprocatory arms, and means for rotating said eccentric and the shaft of the revoluble arms at variable speed.

13. In a candy-working machine, the combination with a number of arms for working a mass of candy and comprising a pair of arms for reciprocation toward and from each other and a pair of arms for revolution in an orbital path, a pair of rock-shafts carrying said reciprocatory arms, a shaft carrying said orbitally-movable arms, a pitman articulated to said rock-shafts, an eccentric fast on said shaft, an eccentric-strap for engaging said eccentric and connected to said pitman, said shaft having fast upon it a member provided with bearing-faces, an actuator engaging said faces, and means constructed and arranged for revolving said actuator in an orbit eccentric to said shaft.

14. In a candy-working machine, the combination with a number of arms for working a mass of candy and comprising a pair of arms for reciprocation toward and from each other and a pair of arms for revolution in an orbital path, a pair of rock-shafts carrying said reciprocatory arms, a shaft carrying said orbitally-movable arms, a pitman articulated to said rock-shaft, an eccentric fast on said shaft, an eccentric-strap for engaging said eccentric and connected to said pitman, said shaft having fast upon it a member provided with bearing-faces, an actuator engaging said faces, a ring mounted eccentric to said shaft and carrying said actuator, gear-teeth upon said ring, and a gear engaging said gear-teeth for rotating the ring.

Signed at Nos. 9–15 Murray street, New York, N. Y., this 26th day of May, 1905.

FRANCIS H. RICHARDS.

Witnesses:
    CHAS. LYON RUSSELL,
    JOHN O. SEIFERT.